United States Patent [19]
Marks

[11] 3,785,011
[45] Jan. 15, 1974

[54] FISHING LINE
[76] Inventor: William J. Marks, 5348 W. Lazy Heart St., Tucson, Ariz. 85713
[22] Filed: June 10, 1971
[21] Appl. No.: 151,980

Related U.S. Application Data
[63] Continuation-in-part of Ser. No. 853,241, Aug. 27, 1969, abandoned.

[52] U.S. Cl.............. 24/115 H, 24/115 B, 24/131, 24/136, 43/43.13, 43/44.83
[51] Int. Cl.. F16g 11/00, A01k 91/00, A01k 91/04
[58] Field of Search............................ 24/236, 115; 43/44.83, 42.49

[56] References Cited
UNITED STATES PATENTS

| | | | |
|---|---|---|---|
| 210,004 | 11/1878 | Burchard | 24/115 J |
| 188,442 | 3/1877 | Tobin | 24/115 B |
| 1,344,959 | 6/1920 | Pollard | 24/115 H |
| 2,222,277 | 11/1940 | Baker | 43/44.83 |
| 2,984,882 | 5/1961 | Winn | 24/131 |
| 3,083,492 | 4/1963 | Kling | 43/43.13 |

FOREIGN PATENTS OR APPLICATIONS

| | | | |
|---|---|---|---|
| 641,085 | 5/1962 | Canada | 43/44.83 |
| 237,121 | 6/1910 | Germany | 24/236 R |

Primary Examiner—Paul R. Gilliam
Attorney—William H. Drummond

[57] ABSTRACT

A novel device for fastening flexible line to inflexible articles. The primary application is in sport fishing for tying fishing line to fishing tackle. Fishing line can be conveniently and securely fastened and unfastened to fishing tackle in a matter of seconds without knotting the line. In the device, a hook is formed at one end of an elongate shank as a means for attachment to the eye of a fish hook, snap swivel, lure or similar apparatus. The end of the device's hook is formed to provide an anchor for a fishing line bight whose ends wind around the shank to means at its upper end for engaging the bight ends.

1 Claim, 6 Drawing Figures

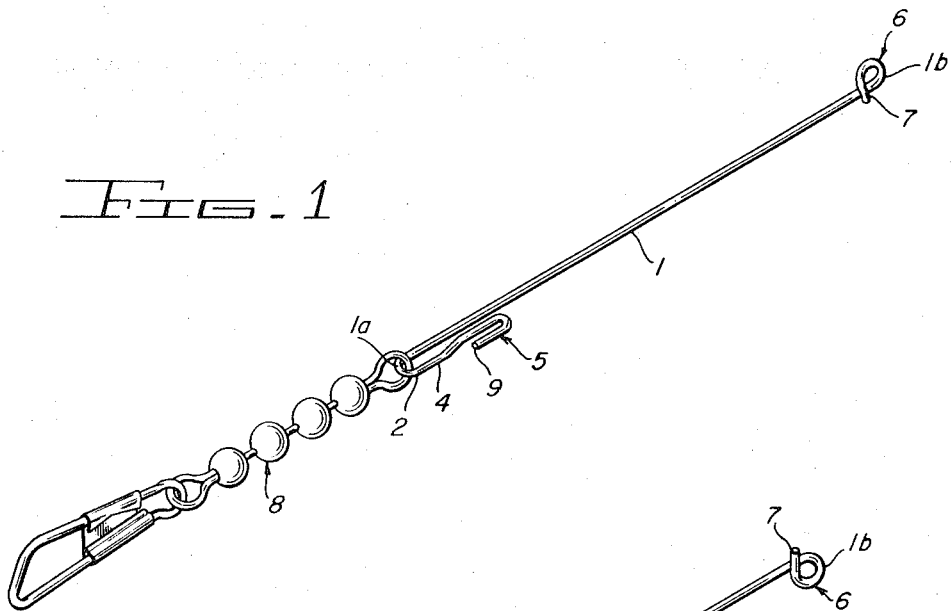
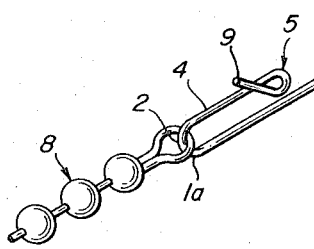
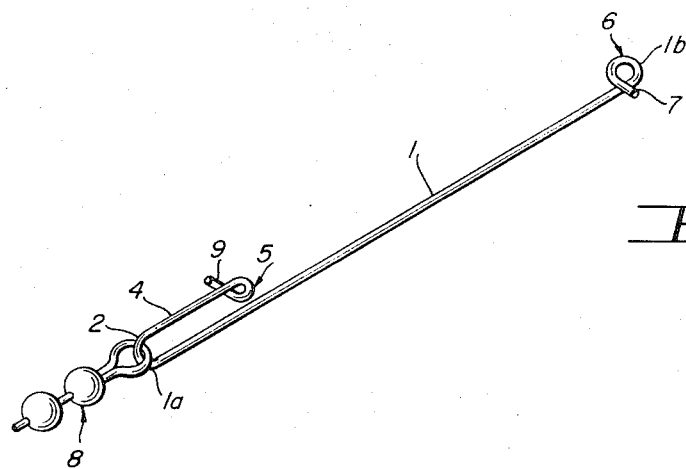

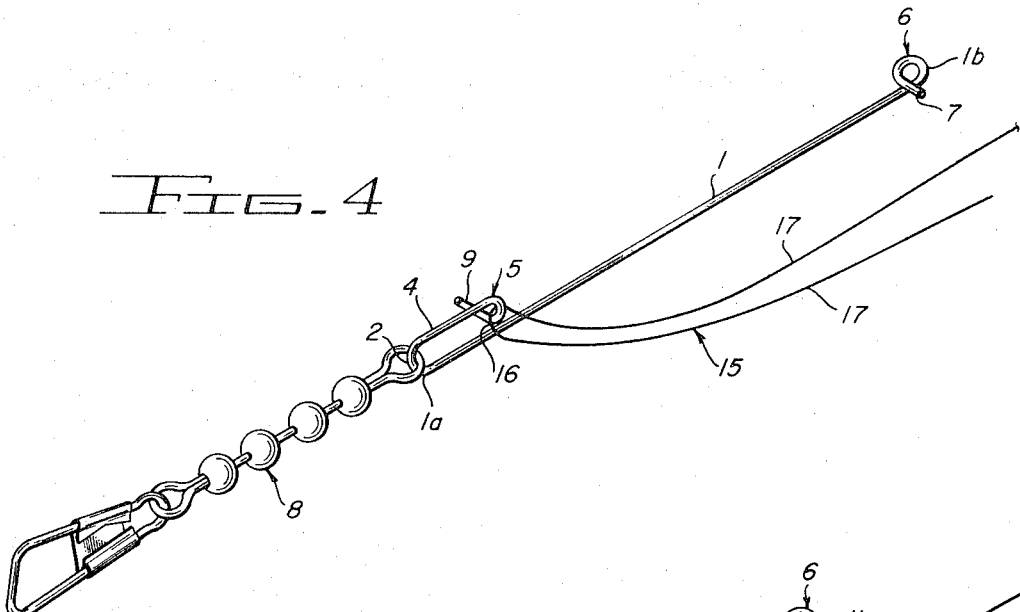
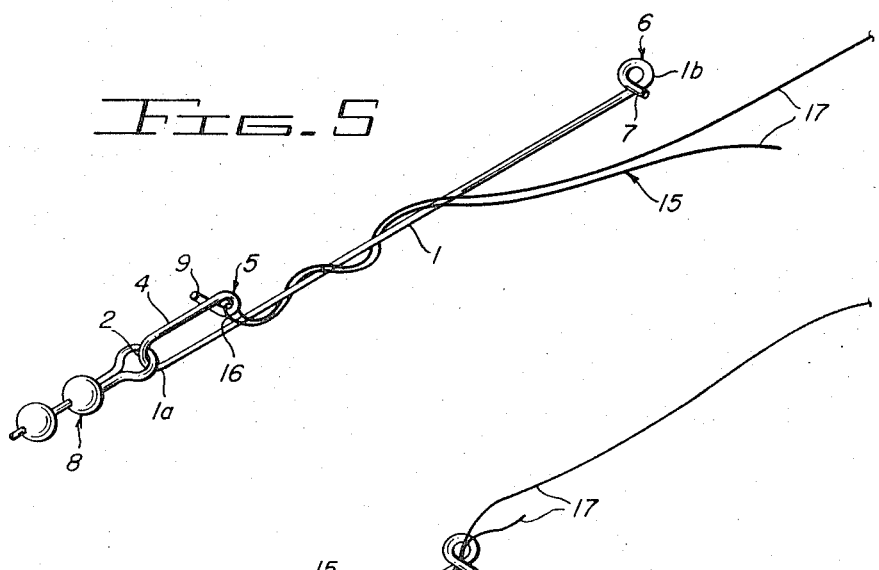
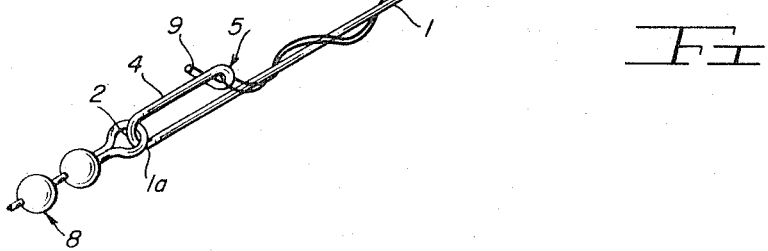

FISHING LINE

This application is a Continuation-in-Part to my copending application entitled "Fishing Line Attachment", Ser. No. 853,241, filed Aug. 27, 1969, now abandoned.

My invention relates to a device for connecting flexible lines to inflexible connecting devices.

More specifically, in one aspect the invention relates to a fastener for connecting fishing tackle to fishing lines.

One of the most frustrating and inconvenient steps in the preparation of fishing tackle is the attachment of the fishing tackle such as to a fishing line. A quick, convenient means for attaching and removing such tackle to fishing lines has long been desired by fishermen. Similarly, in a fishing situation it is highly desirable to have a device for quickly replacing tackle in the event a fish snaps the line or the hook or lure catches in an underwater snag. Formerly, there was no reasonable alternative to fastening the fishing line to the tackle by means of a knot. Devices have been made which make it convenient to change hooks and lures, but these devices, generally snap swivels, still must be connected to the fishing line, and no satisfactory or convenient method for fastening and un-fastening the snap swivel to the fishing line has heretofore been devised. Once tied on to the line the snap swivel must be removed, as a practical matter, by cutting the line. This involves the handling of an additional tool with concomitant inconvenience, annoyance, and some danger if weather conditions are adverse.

The whole problem is compounded in the case of amateur anglers and others who are unskilled in knot tying or who are awkward in manipulating small objects. For example, persons with arthritic hands find the task of knot tying almost impossible; small children who do not have well developed coordination find it a very difficult task. Knot tying at night or in semi-darkness, or in a rocking boat, is an annoying task even for the skilled fisherman.

With the introduction of plastic monofilament lines, the foregoing problems were intensified. Plastic lines are especially difficult to tie in knots that will hold. Many knots that are perfectly satisfactory for use with fiber lines unravel if tied with plastic lines. If tied too tightly, knots crimp and weaken plastic lines, causing them to break.

Accordingly, a principal object of my invention is to provide a fastening device for use in all situations where there exists the problem of fastening flexible lines to inflexible hooks, eyes and similar objects.

More specifically, it is an object of my invention to provide a convenient, simple fastener for attaching the eye of fishing tackle to fishing lines.

Still another object is to provide such a device which is of simplified and economical construction.

Yet another object of the present invention is to provide a method for releasably securing a fishing line to a fastener of the above type without knotting said line.

Other, further, and more specific objects and advantages of the invention disclosed will become apparent to those skilled in the art from the following description of my invention taken in conjunction with the drawings in which:

FIG. 1 is a perspective view of a presently preferred embodiment of my invention showing the invention connected to a conventional snap swivel.

FIG. 2 and FIG. 3 are illustrations of other embodiments of the invention.

FIG. 4, FIG. 5, and FIG. 6 are sequential views of the device of FIG. 3 illustrating the method of fastening a fishing line to a snap swivel.

Briefly, I provide a fastener for releasably attaching a fishing line to the attaching eye of fishing tackle without knotting the line. The fastener has an elongate shank portion which may be considered to have an upper end and a lower end. Fishing-tackle-eye-retaining means are formed integrally with the shank at the shank's lower end. The fishing-tackle-eye-retaining means is generally U-shaped in the form of a hook having a downwardly extending leg, which is an extension of the shank, and an upwardly extending leg. On the upwardly extending leg, I provide a fishing line anchor which is formed integrally with the upwardly extending leg and which is shaped to engage and retain a fishing line bight having upwardly extending ends. As implied in the foregoing description and as will be readily understood by fishermen, one of the upwardly extending ends is affixed to a rod-and-reel combination, a trout line, a trolling pole, or other securing point from which the fisherman can manipulate the fishing line. At the upper end of the shank portion of the fastener I provide a loop for retaining a fishing line. This loop is formed integrally with the shank portion and is shaped to engage and retain the upwardly extending ends of the fishing line bight which are wrapped spirally and upwardly around the shank portion to the retaining loop.

Turning now to the drawings, wherein presently preferred embodiments of my invention are depicted, in FIGS. 1–3, the elongate shank 1 has a bend 2 in its lower end 1a. The bend 2 which is an extension of the shank 1 has a return leg 4 which terminates in an anchor 5. The upper end 1b of the shank 1 ends in an eye portion 6 made with a circular bend. The end 7 of the eye portion 6 crosses over and touches the shank 1.

The fishing tackle, here specifically shown as a snap swivel 8, slips over the end 9 of the anchor 5 and slides down the return leg 4 to the bend 2 at the lower end 1a of the shank 1. The return leg 4 and anchor 5 do not touch the shank 1, although as a matter of preference, either or both could be made to touch.

In FIGS. 4–6, the method and technique of using my invention is illustrated. A length of line 15, one end of which extends from a securing point, is doubled to form a bight 16 and a doubled length of line 17. The bight engages the anchor 5 and the doubled line 17 is spirally and upwardly wrapped around the shank 1 in either direction, preferably in the same direction in which the end 7 of the eye portion 6 crosses the shank 1.

The number of winds required depends upon the texture and perhaps the size of the line desired to be attached. As few as five complete turns will suffice for most types of line. The minimum requirement for any particular type of line can be easily determined by winding several turns of the line and tugging with the force it is expected to support to determine if it holds.

When the winding approaches the upper end 1b, the doubled line 17 should cross approximately perpendicular to the shank 1 just below the point on the shank 1 where the end 7 of the eye portion 6 crosses over the shank. The doubled line 17 is then gently but firmly pulled with a force parallel to the shank 1, causing it to go into the eye portion 6 at the upper end 1b of the shank 1.

The loop 16 closes the opening between the hook 5 and the shank 1 to lock in the snap swivel 8. The doubled line 17 frictionally engages itself and the shank 1 to prevent the unravelling of the line 15 from its attachment to the device. It is not necessary that the doubled line 17 extend all of the way up the shank 1 to the eye portion 6; however, it is highly recommended that the doubled line 17 be formed to do so. It provides more frictional engagement with fewer turns and is a preferred embodiment. The anchor 5 prevents the sliding of the line 15 along the shank 1 in addition to serving as part of the means for locking in the snap swivel 8. The eye portion 6, at the upper end 1b of the shank, holds the doubled line 17 in winding relationship to the shank 1. Thus, the full frictional engagement of the strands of doubled line 17, to each other and to the shank 1, is maintained.

Having now fully described my invention and the presently preferred embodiment thereof, I claim:

1. A fishing apparatus assembly for releasably securing a fishing line to the attaching eye of fishing tackle without tying a knot in said line, said assembly comprising, in combination:
   a. a fastener, including
      1. an elongate shank portion having an upper end and a lower end;
      2. fishing tackle eye-retaining means formed integrally with said shank at the lower end thereof, comprising
         a generally U-shaped hook comprising a return leg forming an extension of said shank portion and substantially parallel thereto, and
         an anchor formed integrally with said return leg and extending in opposite direction to said U-shaped hook
      3. a fishing line retaining loop formed integrally with and spaced from said shank portion at the upper end thereof; and
   b. a fishing line extending from a securing point toward the free end thereof,
      said free end doubled back upon said fishing line toward said securing point to form a bight therein and a length of doubled line,
   said bight engaged over said anchor and said doubled length of line extending toward said securing point from said anchor and spirally wrapped around said shank portion and extending through said line-retaining loop.

* * * * *